United States Patent [19]
Fielding et al.

[11] Patent Number: 6,078,952
[45] Date of Patent: Jun. 20, 2000

[54] METHOD AND APPARATUS FOR MAINTAINING DIRECTORY SERVICES FOR A VIDEO TRANSMISSION NETWORK

[75] Inventors: William S. Fielding; Christopher R. Plater, both of Vancouver, Canada

[73] Assignee: International Business Machines Corporation, Armonk, N.Y.

[21] Appl. No.: 08/904,774

[22] Filed: Aug. 1, 1997

[51] Int. Cl.[7] .................................................. G06F 15/177
[52] U.S. Cl. ...................... 709/221; 707/201; 364/283.1
[58] Field of Search .................. 707/201, 4; 395/200.51; 709/221; 364/283.1

[56] References Cited

U.S. PATENT DOCUMENTS

| 5,113,519 | 5/1992 | Johnson et al. | 707/201 |
|---|---|---|---|
| 5,151,989 | 9/1992 | Johnson et al. | 707/201 |
| 5,327,560 | 7/1994 | Hirata et al. | 395/200.51 |
| 5,388,255 | 2/1995 | Pytlik et al. | 707/4 |
| 5,630,116 | 5/1997 | Takaya et al. | 707/201 |
| 5,631,904 | 5/1997 | Fitser et al. | 370/261 |

Primary Examiner—Glenton B. Burgess
Assistant Examiner—Chuong Ho
Attorney, Agent, or Firm—Kenneth A. Seaman

[57] ABSTRACT

A video information transmission network having a plurality of nodes including at least one master node and a number of slave nodes responsive to master node; as well as an information directory containing directory information. The information directory includes a central directory associated with the master node, and a number of slave directories associated with the slave nodes. There is a directory maintenance updater associated with the information directory adapted to maintain information in the slave directories consistent with information in the central directory.

20 Claims, 3 Drawing Sheets

METHOD AND APPARATUS FOR MAINTAINING DIRECTORY SERVICES FOR A VIDEO TRANSMISSION NETWORK

CROSS REFERENCES TO RELATED PATENTS

The following Patent Applications:

| S/N | Title | IBM Docket No. |
|---|---|---|
| 08/904,813 | Multiplexer for Multiple Media Streams | CA 97 025a |
| 08/904,773 | Method and Apparatus for Controlling Elementary Stream Data Flow | CA 97 025b |
| 08/904,819 | Frame Buffer for Multimedia Terminal | CA 97 026 |
| 08/904,778 | Isolation of Multimedia Signals for Transmission and Processing Within a Multimedia Terminal | CA 97 027 |
| 08/905,197 | Internet Application Access Server Apparatus and Method | CA 97 031 |
| 08/904,493 | Network Communication Services Method and Apparatus | CA 97 034 |
| 08/904,776 | Method and Apparatus for Controlling Access in a Video Distribution Network | CA 97 036 |
| 08/904,775 | Method and Apparatus for Controlling Network Switches | CA 97 037 |
| 08/904,872 | Method and Apparatus for Controlling a Mixed Network of Analog and Digital Switches | CA 97 038 | are related to this patent application and are incorporated herein by reference.

FIELD OF THE INVENTION

This invention relates to methods and apparatus for maintaining, updating, and distributing call information and configuration information for a video transmission network of the type that can be used for video conferencing or video transmission.

BACKGROUND OF THE INVENTION

Video transmission and conferencing networks (which, of course, usually include audio information) require up to date configuration information (including scheduling information) and call management information which we will refer to as directory management services. From one point of view, that of maintaining current information simply it would be preferable to have all information concentrated at a single location, for instance with the node controller (CNC) of the network. As these types of networks can be extremely large with many sites, it would seem that distributing this information across many sites would permit more efficient network operation; however, that would necessitate more complex management of the configuration and call management information as updating alone would have to be done at all information storage sites and the site information would be required to be kept updated (in "synchronization").

SUMMARY OF THE INVENTION

In the case of a video network as above it has been found convenient to use a master slave concept in the arrangement of the network, with a central node controller (CNC) and its associated databases and programming to manage a network of slave nodes or remote intelligent processors such as service node controllers (SNC), switch controllers (SWC), event scheduler system controllers (ESS). In this embodiment of the invention essentially the directory management services facility is split into two parts, the Central Directory Service, which is called the master and resides on the Central Node Controller (CNC) and the slave Directory Service, which resides on other Directory nodes, e.g. the SNC, SWC, ESS, etc. For the purposes of updating the information on the slaves information would be sent from the master. Updates containing selected information can be sent to selected slave sites as appropriate to the information types required by the slave sites concerned or merely to keep the selected slave sites current with the level of directory management services on the master. As a result of reviewing this document it may be realized by those skilled in the art that updates relating to configuration management and call management need not go to all dependent (slave) nodes as only some are required to implement call information (e.g. a ESS node) whereas the other may only need to implement configuration management (e.g.. a SWC node).

In another aspect of the invention the directory management services facility can be viewed as a client server model in which the Configuration and Reservation Log sub-components of a video transmission network form the server end of the Directory Services, and the slave directory nodes acts as the client. This is advantageously done in order to decouple the server data from the client data, to prevent directory information clients from accessing the server data directly.

As indicated above, the directory services such as those associated with call scheduling and configuration information for the network are preferably made part of a centralized function maintained in a central database associated with the CNC, the directory management services. For efficiency copies of this information are replicated and sent to remote intelligent processors, such as the SNCs which filter this information and save a relevant copy for the terminals (video terminals) that they serve. The SNCs act as servers for the video terminals (the clients).

Another aspect of the invention provides an information transmission network having a plurality of nodes including at least one master node; a plurality of slave nodes responsive to the master node; and an information directory containing directory information. The information directory includes a central directory associated with the master node, and a plurality of slave directories associated with the slave nodes; as well as directory maintenance means associated with the information directory adapted to maintain information in the slave directories consistent with information in the central directory.

The directory maintenance means preferably is associated with the master node and includes updating means to update the slave directories when the directory information in the slave directories are out of date with the central directory.

Preferably the updating means compares the version numbers of the information in the central directory with the version numbers in the slave directories.

The maintenance means is preferably associated with the master node and the slave nodes.

The maintenance means at the slave nodes preferably includes means responsive to startup of the slave nodes to request download of current information from the central directory associated.

The maintenance means at the slave nodes preferably includes means to determine whether the version of the information at the slave nodes is the same as at the database directory associated with central node and to request a download update if out of date.

The maintenance means at the master node may include updating means to initiate transfer of current information from the central directory to slave nodes when information in the central directory is updated.

As the slave nodes may include nodes having different characteristics and the master node is provided with information on the presence of the slave nodes and their characteristics and the type of information required by the slave nodes; the maintenance means at the master node is preferably adapted to filter information sent to the slave directories in accordance with the requirements of the characteristics of the slave nodes to which the information is sent.

The directory information comprises network configuration information and call information in the case of a video transmission network.

In another embodiment of the invention the network includes a master node; a number of router nodes connected to the master node; and a number of slave nodes connected to the router nodes.

The router nodes preferably include maintenance means adapted to transfer directory information to slave nodes; wherein the maintenance means associated with the master node is adapted to transfer directory information to the router nodes.

The slave nodes may include maintenance means adapted to request updates directory information from the routers to which they are connected.

The invention herein is preferably accomplished by software programming operating on computer controlled telecommunication hardware in which the invention is implemented by a program storage device readable by a machine, tangibly embodying a program of instructions executable by the machine for causing the establishment of an information transmission network having a plurality of nodes including at least one master node; a plurality of slave nodes responsive to the master node; and an information directory containing directory information. The program includes modules for establishing the information directory including a central directory associated with the master node, and a plurality of slave directories associated with the slave nodes; as well as directory maintenance means associated with the information directory adapted to maintain information in the slave directories consistent with information in the central directory.

The program preferably is adapted to establish directory maintenance means associated with the master node and includes updating means to update the slave directories when the directory information in the slave directories are out of date with the central directory.

The updating means may comprise means to compare the version numbers of the information in the central directory with the version numbers in the slave directories.

The maintenance means may be associated with the master node and the slave nodes The maintenance means at the slave nodes preferably includes means responsive to startup of the slave nodes to request download of current information from the central directory associated with the master node.

The maintenance means at the slave nodes preferably includes means to determine whether the version of the information at the slave nodes is the same as at the directory associated with master node and to update a download request if out of date.

The maintenance means at the master node preferably includes updating means to initiate transfer of current information from the central directory to slave nodes when information in the central directories is updated.

Where the network includes slave nodes having different characteristics and the program includes instruction means such that the master node is provided with information on the presence of the slave nodes and their characteristics and the type of information required by the slave nodes the maintenance means at the master node is adapted by the program to filter information sent to the slave means in accordance with the requirements of the characteristics of the slave nodes to which the information is sent.

In a video transmission network the directory information may include network configuration information and call information. The network configuration information includes information on the arrangement of nodes and hardware in the network and selected characteristics of nodes and hardware; and the call management information includes information relating to schedules of calls user access information.

The program also may include programming to establish a network with a master node; a plurality of router nodes connected to the master node; and a plurality of slave nodes connected to the router nodes.

The program can further include programming to provide the router nodes with maintenance means adapted to transfer directory information to slave nodes; wherein the maintenance means associated with the master node is adapted to transfer directory information to the router nodes.

In another aspect of the programming the slave nodes may be provided with maintenance means adapted to request updates directory information from the routers to which they are connected.

BRIEF DESCRIPTION OF THE DRAWINGS

The present invention will be more fully understood by reference to the following detailed description, which should be reviewed with the accompanying drawings in which:

FIG. 2 depicts a video transmission or conference network which includes a number of slaves and intermediately arranged routers connected there between.

DETAILED DESCRIPTION

Figure 1:
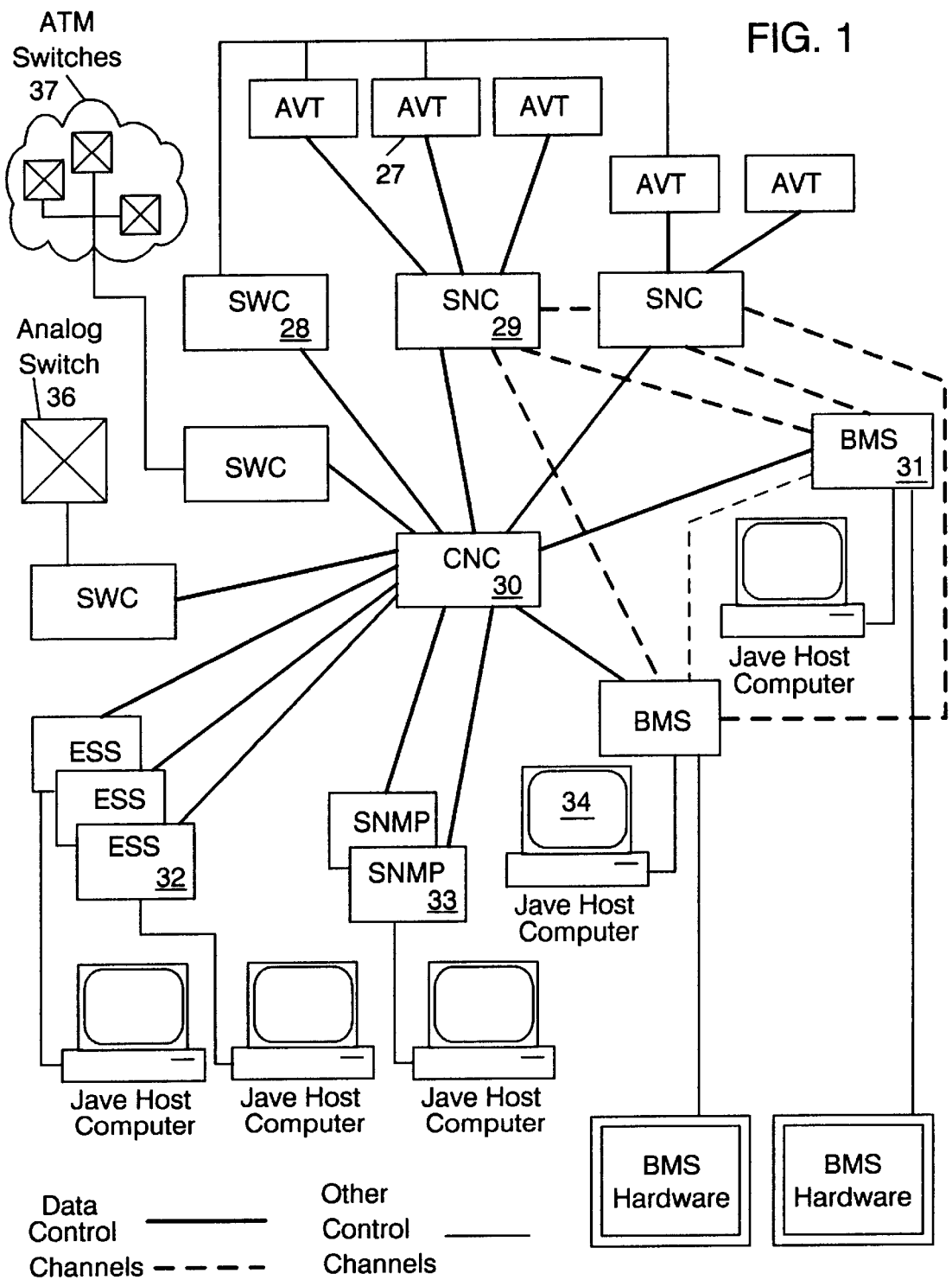
FIG. 1 depicts a video transmission or conference network comprised of a central node controller and several other nodes that are dependent on and connected to the central node controller (CNC)

Referring to FIG. 1 a generalized view of a network to which the instant invention could be applied is presented. The network is comprised of a Central Network Controller (CNC) 30, an Event Scheduler System 32, a Simple Network Management Protocol node 33, and a Service Node Controller (SNC) 29 to which audio video terminals 27 may be connected. The CNC is considered to be the master as it controls the network. The other nodes are considered to be slaves for the purpose of this discussion. The Central Directory Service is stored in the database associated with the CNC 30. The slave directory service information is stored in storage associated with the slaves. This is accomplished by a Directory Task, dirT, which resides at each location CNC, SNMP, SNC, SWC.

DirT conveys Call Information and Configuration Information. Call information can include, call schedules, sites, start and end times, connections, call ID, and the Permission Granted to Add (PEGAD) used for granting permission to a site to use the video information from another site. Configuration information includes network object information such as switches, circuits, sites, site groups, subscribers and AVTs (sites).

Referring to the source code listing attached and labeled Appendix 1 DirT it can be seen that the copy of dirT associated with a master node, (e.g. the CNC) can download and update information on all other nodes i.e. slave nodes such as the SNC or others. When dirT is associated with a slave node, that node requests a download if it is just started or a updates depending on any discrepancy in the version numbers of the information between master and slave. The slave node asks for the version number on startup. If it finds it is out of date it requests an appropriate download from the master.

Appendix 4 illustrates a source code implementation of the download process under which call information is downloaded if the version number of some calls are out of date. In addition configuration database is checked by version number to determine if it up to date, and if identified objects (switches, circuits, devices, sites, site groups, services, subscribers, routers) are out of date it causes the download of up to date replacement information to occur.

The source code listing in Appendix 2 illustrates how updating may be achieved. A slave node that is registered with the CNC would get a configuration update when the CNC configuration is updated. When an update is made to call information the CNC sends the information only to application nodes, such as the ESS or SNC nodes. We refer to this information as being filtered. The filter which achieves this result was implemented in this example in the reservation log services of the network, Appendix 3 which illustrates source code for distributing Call information to nodes that require that Call information. This source code illustrates source code for creating, modifying and deleting Call information under system control. This code when implemented will reside and be operated by the CNC.

Filtering

It may be appreciated that not all node sites require the same amount or type of information. Information from Directory Management Services is supplied, preferably filtered in accordance with node requirements. For instance, an ESS node which is used for event scheduling requires Call information and some configuration information. A SWC node may require switch and configuration information. A SNC node would likely require call and configuration information while a SNMP node may require only configuration information. Once recognized that this can be done and improve overall efficiency suitable programming can be implemented to achieve this result.

Routers

Figure 2:
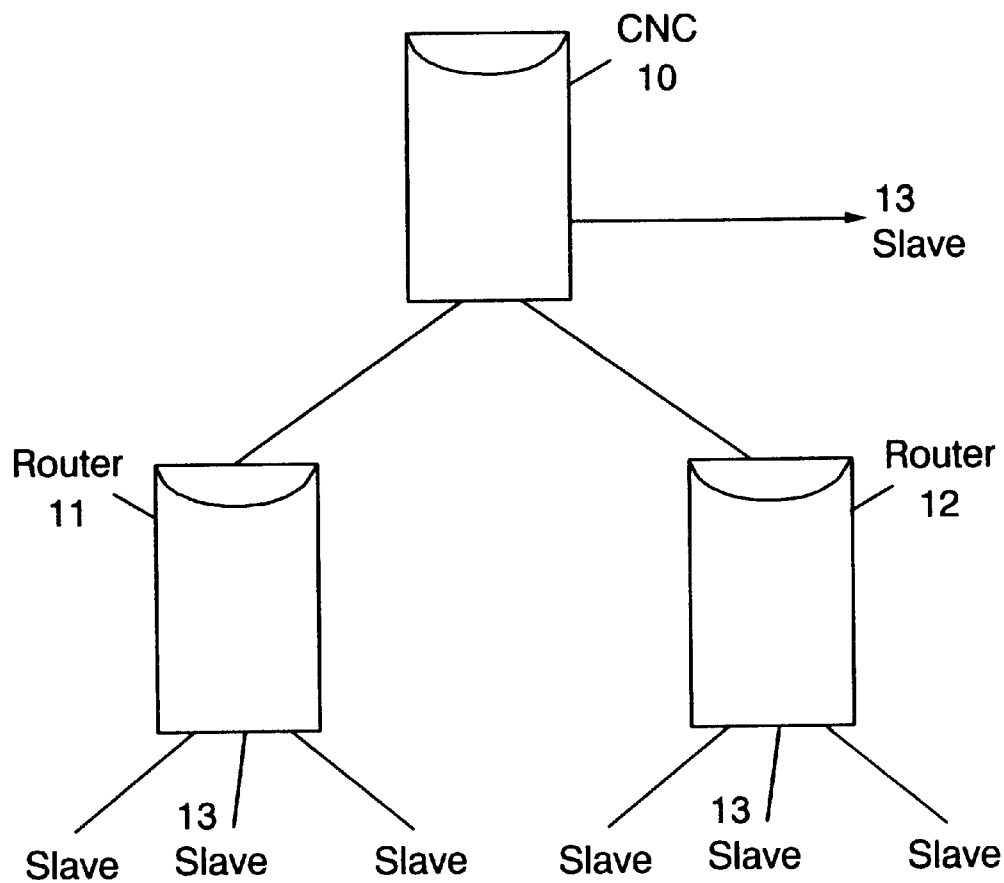

In the situation of a large network with a large number of nodes or terminals it will prove to be advantageous for the provision of router resources as depicted in FIG. 2, which illustrates a part of the control structure of a network. As downloading and updating can take considerable amount of time from the operations of a CNC 10 or master node it would be preferable to provide an alternative to downloading and updating slave nodes 13 directly from the CNC.

As may be appreciated from the structure of FIG. 2 a CNC 10 can initially download call and or configuration information to routers 12. For instance when the routers start up they are under system control to request a full download from the CNC 10. In order for a slave 13 to start up it requires its associated router to startup. When a slave 13 starts up it downloads the relevant configuration and call information from its associated router, not from the master CNC.

Any update sent from CNC 10 to a router may be sent from the router to a slave if requested. As may be well appreciated filtered information may be sent during normal function execution, i.e. automatic updates to slaves whether the updated information are desired or not.

Figure 3A:
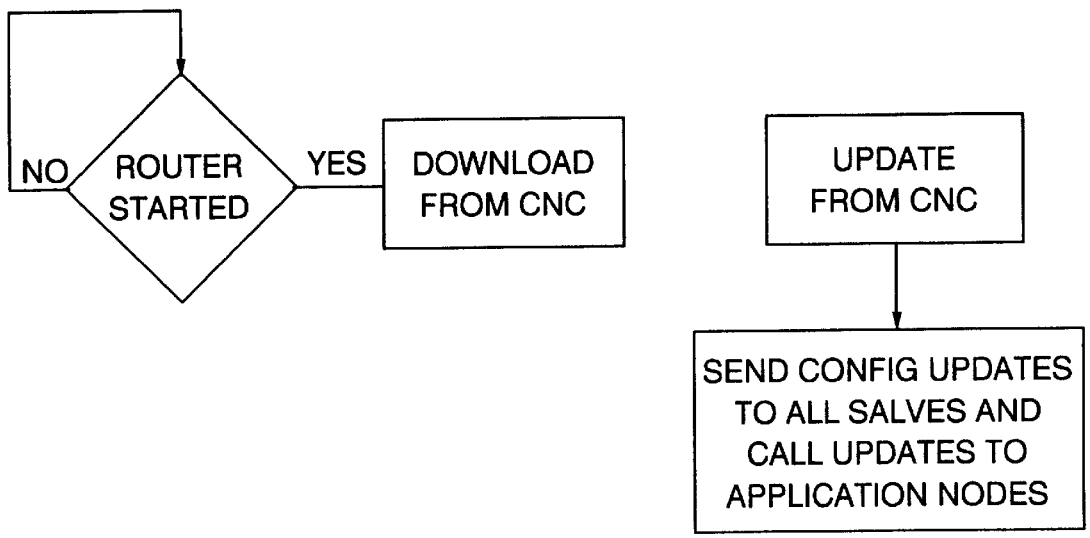
FIG. 3 depicts a flow chart of the operation of a router in the network depicted in FIG. 1.
Figure 3B:
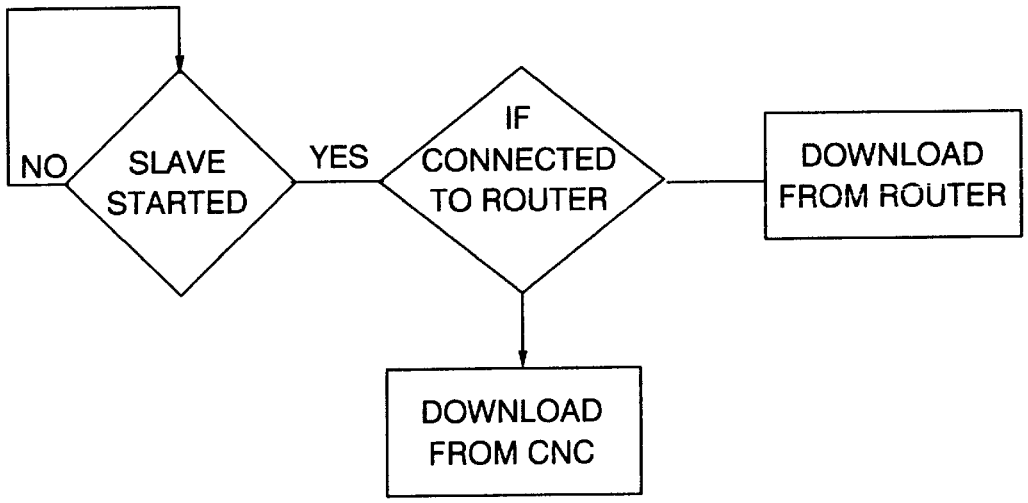

FIG. 3 depicts a flow chart illustrating the downloading and updating of information with respect to the router and slaves. As may be appreciated this is typically imbedded in programming for use. Because of the simplicity of the processes involved the processes illustrated should be sufficient for an expert skilled in the art of the invention to appreciate the architecture and operation of the invention.

GLOSSARY

| | |
|---|---|
| Scheduling a call | Reserving relevant resources within the specified start and end time of the call. |
| Schedule Information | The call schedule includes the time of call, the owner of the call (site to which call will be charged to), the sites involved in the call, the id and database id of the call and status of the connections in the call. |
| Node | A collection of a minimum number of specified software components or tasks (processes) that are responsible for starting the tasks within the collection, monitoring and providing status information to the network and shutting down the tasks. A node can be augmented to contain other tasks that perform specific functions in the network. |
| Directory Node | A node that contains directory tasks. |
| Directory Tasks | A task that requires directory information in order to function. |
| Directory Information | A union of all the directory objects needed by the directory tasks. This forms a subset of the Call and Configuration databases. |
| Configuration Information | Information about nodes, hardware elements, and users in a network. |

ABBREVIATIONS AND ACRONYMS

| | |
|---|---|
| CNC | Central Node Controller |
| SNC | Service Node Controller |
| BMS | Broadband MultiSite Server |
| SWC | Switch Controller |

While the above is a complete description of the preferred embodiment of the present invention it will be well known in the art that it is possible to use various alternatives, modifications, and equivalents. therefore, the scope of the present invention should be determined with reference to the claims with their full scope of equivalents.

What is claimed is:

1. A video transmission network having plurality of nodes including at least one master node, a plurality of slave nodes responsive to said master node through routers of the video transmission system, and an information directory system containing directory information, said information directory system being characterized by;

a central directory associated with said master node, and
  a plurality of slave directories each associated with at least one of said slave nodes; and directory maintenance means at said master node, said routers, and said slave nodes for controlling said information directory system through the routers to maintain information in said slave directories consistent with information in said central directory wherein said slave nodes include nodes having different characteristics and wherein said master node is provided with information on the presence of said slave nodes and their characteristics and the type of information required by said slave nodes; wherein and said maintenance means at said master node is adapted to filter information sent to said slave directories in accordance with the requirements of the characteristics of the slave nodes to which the information is sent.

2. The network of claim 1 wherein said directory maintenance means comprises comparison means to compare the version numbers of the information in said central directory with the version numbers in said slave directories.

3. The network of claim 1 wherein said maintenance means at said slave nodes includes means responsive to startup of said slave nodes to request download of information obtained by the routers at startup.

4. The network of claim 3 wherein said maintenance means at said slave nodes includes means to determine whether the version of the information at the slave nodes is the same as at the database associated with central node and to request a download update if out of date.

5. The network of claim 3 wherein said maintenance means at said master node includes updating means to initiate transfer of current information from the central directory to slave nodes when information in said central directory is updated.

6. The network of claim 1 wherein said directory information comprises network configuration information and call information.

7. The network of claim 6 wherein said network configuration information includes information on the arrangement of nodes and hardware in said network and selected characteristics of nodes and hardware; and wherein said call management information includes information relating to schedules of calls user access information.

8. The network of claim 7 wherein said slave nodes include maintenance means adapted to request updates directory information from said routers to which they are connected.

9. The network of claim 1 wherein each of said routers includes startup means for requesting and obtaining a download of information from the master node directory upon startup of that router.

10. In a video transmission network having a number of nodes including at least one master node, a plurality of routers, and a plurality of slave nodes responsive to said master node through said routers, an information directory system containing directory information, said information directory system comprising:

a central directory associated with said master node, and a plurality of slave directories associated with said slave nodes; and directory maintenance means in said routers associated with a central directory and said plurality of slave directories of said information directory system to maintain information in said slave directories consistent with information in said central directory wherein said slave nodes include nodes having different characteristics and wherein said master node is provided with information on the presence of said slave nodes and their characteristics and the type of information required by said slave nodes; and wherein said maintenance means for said master node is adapted to filter information sent to said slave directories in accordance with the requirements of the characteristics of the slave nodes to which the information is sent.

11. For the network of claim 10 where said directory maintenance means includes updating means to update said slave directories when the information in said slave directories is out of date with said central directory.

12. For the network of claim 10 including maintenance means for said slave nodes which includes means responsive to startup of said slave nodes to request download of current information from the directory maintenance means of the router.

13. The network of claim 12 wherein said maintenance means for said slave nodes includes means to determine whether the version of the information at the slave nodes is the same as at the database associated with central node and to provide a download request if out of date.

14. The network of claim 12 including maintenance means for said master node that includes updating means to initiate transfer of current information from the central directory to slave nodes when information in said central directory is updated.

15. The network of claim 14 wherein said directory information comprises network configuration information and call information.

16. The network of claim 15 wherein said network configuration information includes information on the arrangement of nodes and hardware in said network and selected characteristics of nodes and hardware; and wherein said call management information includes information relating to schedules of calls user access information.

17. For the network of claim 10 wherein said slave nodes include maintenance means adapted to request updates of directory information from said routers to which they are connected.

18. In a video transmission network having a plurality of nodes including at least one master node and a plurality of slave nodes connected to the master node through routers, the method comprising:

providing a central directory associated with the master node and a plurality of slave directories associated with the slave nodes;

maintaining network configuration and call information in the slave directories consistent with the information in the central directory through the routers distinguishing between the different characteristics of the slave nodes and providing information to the master node on those characteristics and the type of information needed by each slave node; and filtering by the master node of the information supplied to a directory associated with a slave node in accordance with the information provided to the master node on the characteristics of the slave node and the type of information needed by the slave node.

19. The method of claim 18 including the steps of:

having a router request and obtain a download of information in the central directory upon the startup of the router.

20. The method of claim 19 including the step of having a slave node connected to the router request, on startup of the slave node, the transfer of the information, obtained by the router, to a slave directory associated with the slave node.

* * * * *